US011858253B2

(12) United States Patent
Kreps et al.

(10) Patent No.: US 11,858,253 B2
(45) Date of Patent: Jan. 2, 2024

(54) MACHINE FOR GENERATING OPTICALLY VARIABLE IMAGE ELEMENTS

(71) Applicant: KOENIG & BAUER AG, Würzburg (DE)

(72) Inventors: Edwin Kreps, Zellingen (DE); Emmanuel Thony, Rennaz (CH)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/025,495

(22) PCT Filed: Aug. 18, 2021

(86) PCT No.: PCT/EP2021/072888
§ 371 (c)(1),
(2) Date: Mar. 9, 2023

(87) PCT Pub. No.: WO2022/069107
PCT Pub. Date: Apr. 7, 2022

(65) Prior Publication Data

US 2023/0241881 A1 Aug. 3, 2023

(30) Foreign Application Priority Data

Oct. 1, 2020 (DE) ..................... 10 2020 125 727.9
Oct. 1, 2020 (DE) ..................... 10 2020 125 728.7

(51) Int. Cl.
*B41F 19/00* (2006.01)
*B41F 13/00* (2006.01)
(Continued)

(52) U.S. Cl.
CPC ........ *B41F 19/005* (2013.01); *B41F 13/0024* (2013.01); *B41F 13/193* (2013.01); *B41F 23/0409* (2013.01); *B41F 33/0009* (2013.01)

(58) Field of Classification Search
CPC .. B41F 19/005; B41F 13/0024; B41F 13/193; B41F 23/0409; B41F 33/0009
See application file for complete search history.

(56) References Cited

U.S. PATENT DOCUMENTS

D519,944 S * 5/2006 Ottens .......................... D13/183
7,047,883 B2 5/2006 Raksha et al.
(Continued)

FOREIGN PATENT DOCUMENTS

DE 102005042895 A1 3/2007
DE 102010041398 A1 4/2011
(Continued)

OTHER PUBLICATIONS

International Search Report of PCT/EP2021/072888 dated Dec. 8, 2021.

*Primary Examiner* — Matthew G Marini
*Assistant Examiner* — Leo T Hinze
(74) *Attorney, Agent, or Firm* — Mattingly & Malur, PC

(57) ABSTRACT

In some examples, a machine for generating optically variable image elements on a substrate includes a printing substrate infeed and a printing unit including a printing mechanism by which a substrate guided on a transport path is printed with a coating agent containing magnetic or magnetizable particles. A device for aligning the magnetic or magnetizable particles includes a first alignment device in the transport path and a further alignment device arranged upstream therefrom. During normal operation, the further alignment device is fixed to a frame at the transport path. The further alignment device includes a plurality of magnets that are spaced apart from one another transversely to the transport direction and, during operation, remain stationary. The number of magnets included in the further alignment device correspond to a number of columns of image-pro-
(Continued)

ducing print motifs or groups of image-producing print motifs around a circumference of a forme cylinder.

15 Claims, 12 Drawing Sheets

(51) Int. Cl.

| | |
|---|---|
| ***B41F 13/193*** | (2006.01) |
| ***B41F 23/04*** | (2006.01) |
| ***B41F 33/00*** | (2006.01) |

(56) References Cited

U.S. PATENT DOCUMENTS

| | | | | |
|---|---|---|---|---|
| 2003/0165637 | A1 | 9/2003 | Phillips et al. | |
| 2019/0194416 | A1 | 6/2019 | Raksha | |
| 2021/0008592 | A1* | 1/2021 | Kriege | B41F 13/193 |

FOREIGN PATENT DOCUMENTS

| | | | |
|---|---|---|---|
| DE | 102013015277 | A1 | 3/2015 |
| DE | 102018205883 | A1 | 10/2019 |
| DE | 102018122160 | A1 | 3/2020 |
| DE | 102018127936 | A1 | 5/2020 |
| EP | 2055501 | A2 | 5/2009 |
| EP | 2314386 | A1 | 4/2011 |
| EP | 2468423 | A1 | 6/2012 |
| EP | 3059019 | A1 | 8/2016 |
| EP | 2845732 | B1 | 3/2017 |
| EP | 3178569 | A1 | 6/2017 |
| WO | 2015086257 | A1 | 6/2015 |
| WO | 2019141453 | A1 | 7/2019 |

* cited by examiner

MACHINE FOR GENERATING OPTICALLY VARIABLE IMAGE ELEMENTS

CROSS-REFERENCES TO RELATED APPLICATIONS

This application is the US national phase, under 35 USC § 371 of PCT/EP2021/072888, filed on Aug. 18, 2021, published as WO 2022/069107 A1 on Apr. 7, 2022, and claiming priority to DE 10 2020 125 728.7, filed Oct. 1, 2020, and DE 10 2020 125 727.9, filed Oct. 1, 2020, the disclosures of which are expressly incorporated by reference herein in their entireties.

TECHNICAL FIELD

The invention relates to a machine for generating optically variable image elements on a substrate. For instance, the machine includes a printing substrate infeed, and at least one printing unit comprising at least one printing mechanism, by which the substrate guided on a transport path through the machine is printed at least on a first side with a coating agent containing magnetic or magnetizable particles. A product receiving system is used to receive the substrate treated in the machine. A device for aligning the magnetic or magnetizable particles contained in the coating agent applied to the side of the web-format or sheet-format substrate is provided in the transport path of the substrate between the printing unit and the product receiving system. The printing mechanism incudes, as the image-producing cylinder, a forme cylinder including a multiplicity of image-producing print motifs or groups of image-producing print motifs around the circumference, and which on a circumferential length corresponding to the print image length are arranged in multiple columns, which are equidistantly spaced apart from one another transversely to the transport direction, and on a cylinder width corresponding to the print image width are arranged in multiple rows, which are equidistantly spaced apart from one another in the transport direction. The device for aligning magnetic or magnetizable particles includes a first alignment device, which is arranged in the transport path of the substrate to be conveyed and, in a region of its side facing the transport path, includes a plurality of magnets so as to align, in each case in a surface area comprising a coating agent, at least some of the particles contained in the coating agent in order to generate image information. The magnets of the first alignment device serving alignment purposes and the substrate to which the coating agent containing the particles is applied move synchronously with respect to one another, at least on a section of the transport path.

BACKGROUND

A printing press comprising a screen-printing unit and a device for aligning magnetic or magnetizable particles contained in the printing ink or the varnish is known from EP 2 845 732 B1, wherein the device comprises a cylinder that has, around the circumference, a plurality of elements that induce a magnetic field and a dryer directed toward a point in the transport path at which the substrate has not yet left the cylinder.

U.S. Pat. No. 7,047,883 B2 discloses a magnetically active device in a first embodiment, which can be provided in an in-line arrangement with respect to a printing device and, in the printing substrate path, comprises multiple permanent magnets next to one another. The permanent magnets allow magnetic or magnetizable particles contained in the printing ink to be aligned as the printing substrate is being moved past the magnets. In another embodiment, such magnets are provided at a cylinder shell of a cylinder, over which a printing substrate web that is printed with printing ink containing magnetic or magnetizable particles is guided.

A device for producing layers having an optical effect is disclosed in EP 3 178 569 A1, wherein two cylinders, comprising magnets at their cylinder shells, are provided in the printing substrate path one behind the other, over which a printing substrate web printed with printing ink containing magnetic or magnetizable particles is guided. Using a dryer and a mask that partially covers the printed regions, initially a first partial region can be oriented and dried before another partial region can be aligned by the magnets of the second cylinder and dried.

WO 2015/086257 A1 relates to a method for producing optically variable effect layers, wherein, in one step, at least some of the platelet-shaped magnetic or magnetizable pigment particles are biaxially aligned.

DE 10 2018 127 936 A1 relates to a printing press comprising a screen-printing mechanism and a forme cylinder comprising image-producing elements arranged in a matrix-like manner, that is, in columns and rows, and comprising a first magnetic cylinder and, arranged downstream, a second magnetic cylinder, which comprise first and second magnetic elements in the region of their outer cylindrical surface. These first magnetic elements can be used to align first image elements, and the second magnetic elements can be used to align second image elements that at least overlap the first image elements. The magnetic elements are in each case arranged in a matrix-like manner around the circumference of the magnetic cylinder.

DE 10 2018 205 883 A1 discloses a machine for aligning magnetic particles in previously applied printing ink, wherein, in one embodiment, two magnetic cylinders, and, in another embodiment, even three magnetic cylinders, are arranged one behind the other in the substrate path. Using, for example, two magnetic cylinders that are directed at the same substrate side, it is possible, for example, to align two different printing regions by way of the two magnetic cylinders with differing patterns. After a first region has been aligned, this region is dried before the other region is aligned by means of the second magnetic cylinder.

It is provided in DE 10 2010 041 398 A1 to align magnetic particles contained in printing ink by way of an exposure element, to which a ferromagnetic property was or is imparted offline, in a first embodiment, and online, in a second embodiment, by the application of an external magnetic field. In the case of exposure elements to which the property is imparted from outside the machine, such a magnetic field is spanned, for operation, on a forme cylinder, plate cylinder, blanket cylinder or printing cylinder. When the property is imparted in-line, magnetization representing a magnetic image is entirely generated by solenoids that are directed at the substrate path leading over a cylinder. Multiple solenoids are provided in the circumferential direction, which successively repeat the corresponding magnetization action as the printing substrate passes through. In the process, a magnetizable thin plate or film can enhance the magnetization action originating from the solenoids in that the dynamic magnetization takes effect there and intensifies the dynamic effect.

DE 10 2018 122 160 A1 relates to a sheet-fed printing press and discloses a multiplicity of different machine configurations. Among others, an embodiment comprising a screen-printing unit and at least one downstream magnetic alignment device comprising at least one alignment magnet for aligning magnetic particles contained in the printing ink is disclosed. The alignment there preferably is to take place after the printing ink has been applied. As an alternative or in addition, the printing ink can take place during and/or after the ink application. The at least one alignment device preferably is to be integrated into at least one alignment cylinder and/or be arranged so as to be directed at at least one alignment cylinder.

WO 2019/141453 A1 discloses a method for producing optical effects, wherein, in one embodiment, substrate including magnetic particles contained in printing ink is guided over a magnetic cylinder comprising magnetically active magnetic elements for aligning the particles. In the process, a magnetic field is applied by a magnetic device, which is statically arranged around the circumference of the magnetic cylinder.

SUMMARY

An object herein is to provide a machine for generating optically variable image elements.

This object is achieved in some examples by a machine for generating optically variable image elements on a substrate, and in which a device for aligning magnetic or magnetizable particles comprises at least one first further alignment device, which is arranged upstream from the first alignment device in the transport path of the substrate to be conveyed and which, during normal operation, is fixed to the frame at the transport path and, transversely to the transport direction. The first further alignment device includes a plurality of magnets that are spaced apart from one another transversely to the transport direction and, during operation, remain stationary in the device; the first further alignment device includes a number of magnets that corresponds to the number of columns of image-producing print motifs or groups of image-producing print motifs around the circumference of the forme cylinder, which are arranged in the transport path in such a way that the print motifs or groups of image-producing print motifs are at least, in each case, partially aligned with the lateral position of the magnets of the first further alignment device along the transport path.

The advantages achieved with the invention are in particular that substrates having optically variable image elements can be produced with a three-dimensional impression in high quality and/or improved contrast and/or greater luminance and/or an improved 3D effect, that is, a spatial impression.

After printing ink containing magnetic or magnetizable particles has been applied, the particles are present in the ink matrix in a substantially unorganized manner. By subsequently aligning one or more partial regions for producing image information, for example an alphanumeric symbol, an image motif or pattern, within the previously printed surface area, hereafter also referred to as image-producing or image-generating alignment for short, some of the particles are deliberately aligned in such a way that the desired optical effect is created when the print image is viewed. This takes place by means of an alignment device that introduces corresponding image information, which here is also referred to as “image-producing” or “image-generating” for short.

An embodiment that is of very particular advantage is one in which particles applied to the printing substrate by way of the printing ink, for example at least in a surface area that is relevant for the image or motif to be represented, prior to cooperating with the alignment device provided for the image-producing or image-generating alignment and/or upstream thereof and/or at at least a point in time or during a time period during the cooperation with the alignment device provided for the image-producing or image-generating alignment, cooperate with a further alignment device that serves pre-orientation or simultaneous orientation purposes.

A further alignment device serving pre-orientation purposes causes at least the surface areas in the finished product which are directly adjacent to the motif or pattern to show a more uniform appearance in that the particles present there are not randomly oriented and thus supply a low-contrast background compared to the image motif or pattern. By deliberately and, for example more harmoniously, orienting the particles at least in the vicinity of the image-producing surface areas, a higher contrast can be achieved between the image motif or pattern and the background. In the case of an image-producing alignment and, for this purpose, an at least intermittent simultaneous orientation, it is even possible to achieve a spatial effect with an appropriate magnetic field configuration due to the overlap.

In an embodiment that is to be preferred, the image-producing or image information-introducing alignment device is designed and configured in such a way that the magnets of the alignment device, which are used for the image-producing alignment, and the printing substrate that is printed with the printing ink containing the particles move synchronously with respect to one another, at least on a section of the transport path, while the one or other further alignment device, during normal operation, is fixed to the frame at the transport path, that is, the magnets of the one and/or other further alignment device for pre-orientation or simultaneous orientation, during normal operation, are fixed to the frame or remain stationary during operation, that is, in contrast to the image-producing or image-generating alignment device they do not move synchronously with respect to the printing substrate. The image-producing alignment device is preferably designed as a rotatable cylinder, for example a magnetic cylinder, which carries, around the circumference, magnetic elements serving image-producing alignment purposes and, on its circumference, supports and/or transports the printing substrate on at least a rotation angle segment.

A particularly advantageous device for aligning magnetic or magnetizable particles, which are contained in a coating agent applied to one side of a web-format or sheet-format substrate, comprises a first alignment device, which is arranged in the transport path of the substrate to be conveyed and, in the region of its side facing the transport path, comprises a plurality of magnets so as to align, in each case in a surface area comprising a coating agent, at least some of the particles contained in the coating agent in a defined manner, wherein the magnets of the first alignment device serving alignment purposes and the substrate to which the coating agent containing the particles is applied move synchronously with respect to one another at least on a section of the transport path. In the transport path of the substrate to be conveyed, at least one further alignment device, which, during normal operation, is fixed to the frame at the transport path and comprises a plurality of magnets that, during operation, remain stationary in the device, is assigned to the first alignment device so as to be located upstream or opposite thereof.

In a particularly advantageous embodiment, a further alignment device for pre-orientation purposes arranged upstream from the first alignment device in the transport path of the substrate to be conveyed and comprising a plurality of magnets is provided in such a way that these magnets can induce a pre-orientation of the particles in the surface areas that are at least adjacent to the partial regions related to the image information or that encompass the image information to be generated, and/or a further alignment device for simultaneous orientation purposes comprising one or more magnets is provided, which is arranged at the transport path, on the side of the transport path located opposite the first alignment device, in such a way that identical and/or mutually adjacent surface areas of a surface area encompassing the image information to be generated cooperate at the same time with the first alignment device and with the further alignment device at at least one point in the transport path.

Advantageously, an alignment device serving pre-orientation purposes comprises magnets in such a way that these, in surface areas that are at least adjacent to the partial regions related to the image information or that encompass the image information to be generated, in particular continuously over the coating thickness, that is, the thickness of the applied coating agent, or at least in the visible surface layer, can induce a homogeneous pre-orientation of the or a majority of the particles, at least with respect to the progression of a longitudinal axis of the particles which is projected in the substrate plane. Preferably, the magnets of the further alignment device that is arranged upstream from the first alignment device are configured and oriented in such a way that, in a respective surface area encompassing the image information to be generated, the or a majority of the particles, in particular continuously over the coating thickness or at least in the visible surface layer, in particular both with respect to their axis extending in the longitudinal direction and in the transverse direction, are biaxially aligned parallel to one another or homogeneously in another manner, so that a homogeneous optical impression arises across this surface area.

In the process, an aforementioned homogeneous pre-orientation or alignment can encompass both the ideal case, in which all particles of the observed surface area, in particular in the entire coating thickness or at least in the visible surface layer, are or have been homogeneously pre-oriented or aligned in the above-described manner, and cases of a possibly less ideal, but nonetheless advantageous embodiment, in which a pre-orientation or an alignment of the previously randomly oriented particles exists which is almost completely, that is, at least ninety percent, or at least predominantly, that is, more than 50%, homogeneous. In these cases as well, the observed surface area including some randomly oriented particles, but predominantly homogeneously oriented particles, forms a greater contrast for image information to be introduced into this surface area than particles that are entirely randomly oriented.

In a machine comprising such a device, a printing mechanism is provided in the printing substrate path between a printing substrate infeed and a product receiving system, comprising an image-producing cylinder that is preferably designed as a forme cylinder and includes a multiplicity of image-producing print motifs or groups of image-producing print motifs around the circumference, which on a circumferential length corresponding to the print image length are arranged in multiple columns, which are equidistantly spaced apart from one another transversely to the transport direction, and on a cylinder width corresponding to the print image width are arranged in multiple rows, which are equidistantly spaced apart from one another in the transport direction, and wherein the relevant further alignment device comprises a number of magnets that corresponds to the number of columns, which are arranged in the transport path in such a way that the print motifs or groups of image-producing print motifs are at least in each case partially aligned with the lateral position of the magnets of the further alignment device.

When aligning magnetic or magnetizable particles, which are contained in a coating agent that is applied to one side of a web-format or sheet-format substrate, at least some of the particles contained in the coating agent are aligned by means of a first alignment device comprising magnetics, in a surface area comprising a coating agent, in a defined manner in order to generate image information, while the magnets of the first alignment device serving alignment purposes and the substrate to which the coating agent containing the particles is applied move synchronously with respect to one another, at least on a section of the transport path. Furthermore, prior to reaching the first alignment device, magnetic particles, at least in a surface area containing the image information to be generated, are aligned parallel to one another or homogeneously in another manner by a further alignment device, at least with respect to the progression of a longitudinal axis of the non-spherical particles, as viewed in the projection onto the substrate plane, and/or, during the cooperation with the first alignment device, at the same time have magnetic fields applied thereto, for their alignment, by a further alignment device located opposite the first alignment device at the transport path.

Further details and variant embodiments may be derived from the following exemplary embodiments.

BRIEF DESCRIPTION OF THE DRAWINGS

Exemplary embodiments of the invention are illustrated in the drawings and will be described in greater detail below.

The drawings show.

DETAILED DESCRIPTION

Figure 1:
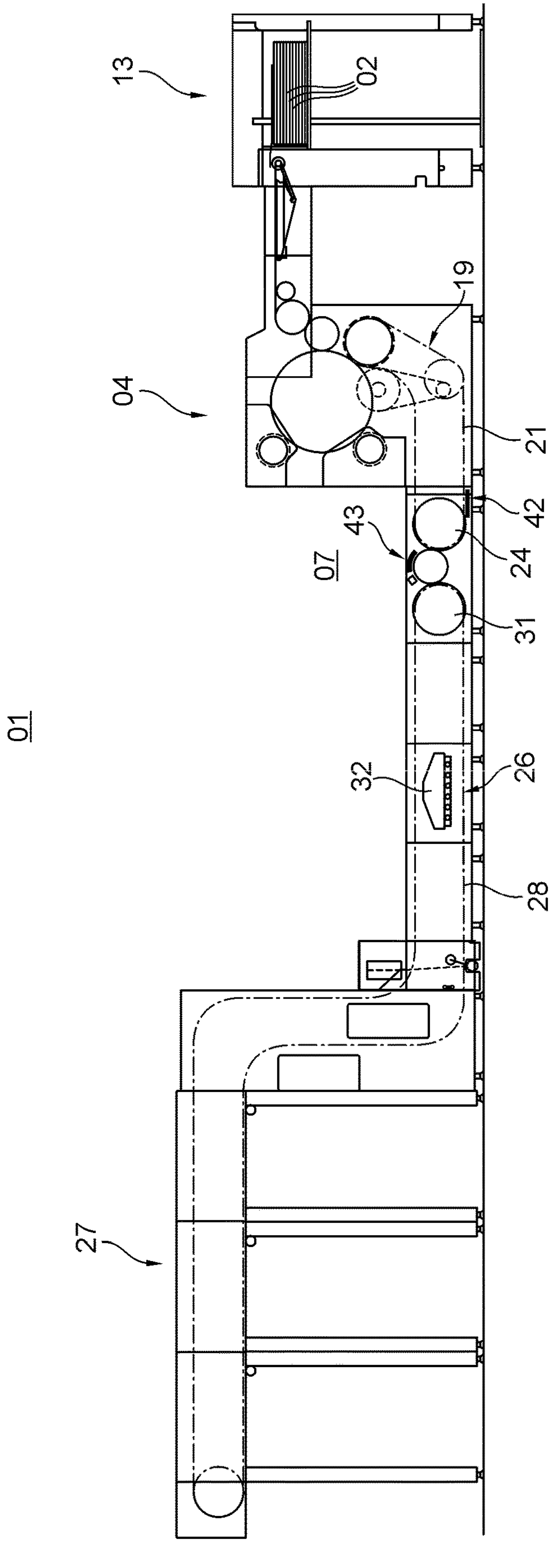
FIG. 1 an exemplary embodiment of a machine for generating optically variable image elements on a substrate.

A machine 01, for example a printing press 01, in particular a security printing press 01, for generating optically variable image elements 03 on a substrate 02, for example a web-format or sheet-format printing substrate 02, comprises an application device 04, for example a printing unit 04, by which optically variable coating agent 06, for example optically variable printing ink 06 or varnish 06, at at least one application point, for example printing nip, can be applied to at least one first side of the substrate 02, for example of the printing substrate 02, across the entire surface area or in partial regions in the form of print image elements 08, and a device 07 for aligning particles P that are contained in the optically variable coating agent 06 applied to the substrate 02 and that are responsible for the optical variability (see, for example, FIG. 1). In the following, this device 07 is also referred to as an alignment device 07 for short or, since it produces an image of the optically variable pattern or motif as a result of a defined alignment of the particles P, is also referred to as an image-producing alignment device 07. An application of coating agent 06 that contains particles P and a subsequent image-producing alignment are schematically shown, for example, in FIG. 2 on the left side (FIG. 2 *a*)) based on the illustration of the numeral I by way of the alignment of previously randomly oriented particles P. The Roman numeral I denotes a state I in which the coating agent 06 has been applied and is present in randomly oriented form, and numeral III denotes a state III in which an image-producing alignment has taken place.

The print image elements 08 made up of a variable coating agent 06, which are applied onto the substrate 02 by the application unit 04 prior to the treatment by the alignment device 07 can correspond to the optically variable image elements 03 to be generated in terms of size and position, or possibly may also be larger than these, and possibly can even extend across the surface area of several multiple-up copies 09. In the case of larger print image elements 08, for example, an optically variable image element 03 is not generated by alignment on the entire surface area that is coated with optically variable coating agent 06.

The particles P responsible for the optical variable contained here in the coating agent 06, for example the printing ink 06 or the varnish 06, are magnetic or magnetizable, non-spherical particles P, for example pigment particles P, hereafter also referred to as magnetic flakes for short. They preferably have a non-spherical, flat shape, having a longitudinal axis extending in the direction of the longest extension, an axis extending perpendicularly thereto in the direction of the width, and a thickness extending with respect to both axes and being smaller compared to the length and width.

The machine 01 is preferably designed to produce multiple-up copies 09, for example securities 09, in particular banknotes 09, or intermediates of such securities 09, for example print images of multiple printing substrate sections containing such securities 09. The substrate 02, for example printing substrate 02, can be formed by, for example cellulose-based or preferably cotton fiber-based paper, by plastic polymer or by a hybrid product thereof. It may be uncoated, or may already have been coated, prior to being coated in the aforementioned application device 04, and it may be unprinted or already have been printed once or multiple times or have been mechanically processed in another manner. On a longitudinal section of web-format substrate 02 or a sheet of a sheet-format substrate 02, preferably several multiple-up copies 09, for example banknotes 09 to be produced, are arranged in a row next to one another, and several such rows of multiple-up copies 09 or their print image are arranged one behind the other in the transport direction T or are to be arranged in the course of the processing operation of the substrate 02 (indicated, for example, in FIG. 2).

The machine 01 designed as a printing press 01 can generally comprise one or more printing units 04 including one or more printing mechanisms of arbitrary printing methods. In a preferred embodiment, however, it comprises a printing unit 04 comprising at least one printing mechanism 11; 12 operating according to the flexographic printing method, or preferably according to the screen-printing method, by which the optically variable coating agent 06 is or can be applied onto a first side of the printing substrate 02. A greater film thickness, compared to other printing methods, can be applied by the described printing methods, in particular the screen-printing method. The expression of the “first side” of the substrate 02 or printing substrate 02 is selected arbitrarily and is intended to refer to the side of the printing substrate 02 onto which the optically variable coating agent 06 is or was or can be applied.

Figure 4:
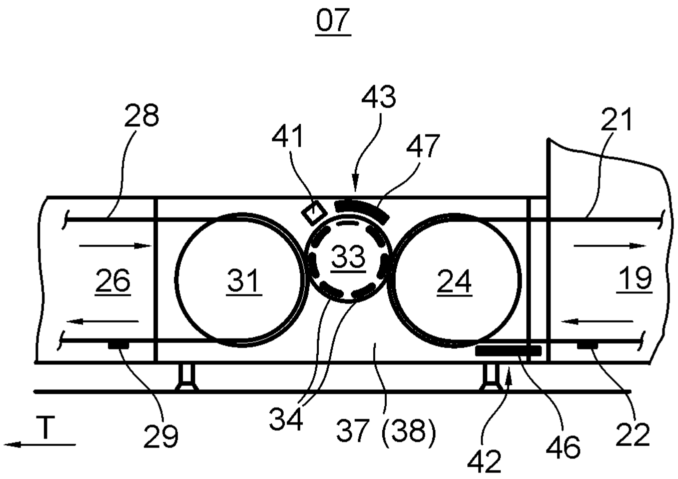
FIG. 4 an enlarged illustration of the device for aligning magnetic or magnetizable particles in a first embodiment from FIG. 1.

In the illustrated and preferred embodiment, the printing press 01 comprises a printing substrate infeed 13, for example a roll unwinder 13, or preferably a sheet feeder 13, from which the, for example, web-format or preferably sheet-format, printing substrate 02 is or can be fed, possibly via further printing or processing units, to the printing unit 04, for example flexographic or in particular screen printing unit 04, which applies the optically variable coating agent 06 and comprises at least one printing mechanism 11; 12, for example flexographic, and in particular screen printing, mechanism 11; 12. In the illustrated and advantageous embodiment, two screen printing mechanisms 11; 12 are provided, which are preferably combined in the same printing unit 04 and, between a respective forme cylinder 14; 16, for example in a screen printing cylinder 14; 16, and a shared impression cylinder 17, form two printing nips for the same, here the first, side of the printing substrate 02 (see, for example, FIG. 4). As a result of being designed as a screen-printing mechanism 11; 12, it is also possible to apply coating agent 06 in a greater film thickness. A drying and/or curing device 18, for example a UV dryer 18, which is directed at the first side of a printing substrate 02 to be conveyed through the printing unit 04, can be provided in the transport path between the two printing nips. Optically variable coating agent 06 can be applicable or be applied with only one or both of the screen-printing mechanisms 11; 12.

Preferably, the printing mechanism 11; 12 comprises a forme cylinder 14; 16 as the image-producing cylinder, including a multiplicity of, in particular like and/or identical, image-producing print motifs or, in particular like and/or identical, groups of image-producing print motifs around the circumference, which, on a circumferential length corresponding to a print image length, are arranged in multiple, for example a number, for example, between four and eight, in particular between five and seven, for example six, columns that are arranged equidistantly from one another transversely to the transport direction T and, on a cylinder width corresponding to the print image width, in multiple rows that are arranged equidistantly from one another in the transport direction T. In the case of a printing mechanism 11; 12 operating according to the flexographic printing method, these print motifs are designed in the manner of letterpress print reliefs, and in the case of the preferred case of a printing mechanism 11; 12 operating according to the screen-printing method, they are designed in the manner of screen-printing stencils.

From the printing unit 04 applying the optically variable coating agent 06, the printing substrate 02 can be fed via conveying means of a first conveyor device 19 to the alignment device 07. In the case of web-format printing substrate 02, this can be one or more positively driven or non-driven rollers, via which the printing substrate 02 can be guided or is guided on the input side into the alignment device 07. For the preferred case of sheet-format printing substrate 02, that is, individual printing substrate sheets 02 passing through the machine 01, sheet-conveying means are provided as conveying means.

In an embodiment that is not shown, these sheet-conveying means can be formed by one or more transfer cylinders or drums, which receive the printing substrate sheet 02 from the printing unit 04, for example from the impression cylinder 17, and possibly deliver it via one or more further transfer cylinders or drums on the input side to the alignment device 07. In the embodiment shown here, however, the first conveyor device 19 is designed as a revolving gripper conveyor 19, for example as a so-called chain gripper system 19, which comprises continuous drawing means 21, for example continuous chains 21, revolving on both sides of the frame and carrying gripper bars 22 that extend transversely to the transport direction T. Due to the gripper bars 22, leading sheet ends can be gripped, and the printing substrate sheets 02 can thus be transported along the conveyor path and, at the destination, be delivered to the appropriate conveying or receiving means. Preferably, a respective sprocket wheel 23; 24, also referred to as a chain gripper wheel 23; 24, is located at least in the receiving area of the printing substrate sheet 02 from the printing unit 04 and in the region of the transfer of the same to the alignment device 07.

After having passed through the alignment device 07, which is described in greater detail below, the printing substrate 02 can be guided via conveying means of a further, for example second, conveyor device 26 to a product receiving system 27 for receiving the printing substrate 02 that has been processed and/or worked in the machine 01, for example a winder 27 in the case of web-format printing substrate 02 or a pile delivery 27 in the preferred case of sheet-format printing substrate 02. For the case of web-format printing substrate 02, this can again be one or more positively driven or non-driven rollers, which continue the transport path of the first conveyor device 19 through the alignment device 07 and via which the printing substrate 02 can be guided or is guided on the input side into the winder 27. For the preferred case of sheet-format printing substrate 02, sheet-conveying means are provided as the conveying means.

These can be formed, as described above, by one or more transfer cylinders or drums, which receive the printing substrate sheet 02 from the alignment device 07 and deliver it downstream to the pile delivery 27. Preferably, the second conveyor device 26, similarly to the first conveyor device, is designed as a revolving gripper conveyor 26, for example a chain gripper system 26, comprising revolving continuous drawing means 28, for example continuous chains 28, one or more sprocket wheels 31 or chain gripper wheels 31, as well as gripper bars 29, which receive the printing substrate sheets 02 from the transport path section of the alignment device 07 and, for example, feed them to the pile delivery 27 (see, for example, FIG. 1).

An additional drying device comprising one or more dryers 32, for example radiation dryers 32, directed at the first side of the printing substrate 02, can be provided at the transport path leading away from the alignment device 07. In a refinement that is not shown, a cooling unit is provided on the transport path between the alignment device 07 and the pile delivery 27, in particular downstream from the additional drying device in the transport path between the alignment device 07 and the product receiving system 27. This cooling unit can be designed as a cooling roller, for example, which is arranged between the second conveyor device 26 coming from the alignment device 07 and a third conveyor device, for example likewise designed as a revolving gripper conveyor, for example a chain gripper system. In a refinement, an inspection device, which is not shown, for example an area scan camera or a line camera, can be provided and, for example, be directed at a circumferential surface segment, located in the transport path, of the roller designed as a cooling roller or in another manner.

Even though the alignment device 07 described hereafter in detail is essentially arbitrary in terms of its designs, variant embodiments or configurations, it is preferably provided or can be provided in an above-described machine 01 or printing press 01. In an advantageous embodiment, it is designed in the manner of a module and can be inserted into the transport path of the machine 01 to be fitted therewith using input-side and output-side interfaces to the open section ends of a conveyor system, which continues upstream and downstream.

The alignment device 07 for creating optically variable image elements 03, for example for creating the optically variable effect in the optically variable coating agent 06 applied previously, for example in the form of print image elements 08, onto the substrate 02, in particular printing substrate 02, has a defined transport path along which the substrate 02 to be conveyed through the alignment device 07 is fed or can be fed from an entrance area, in which the substrate 02 to be treated and comprising, on its first side, variable coating agent 06, is brought into operative connection in a defined manner with an alignment device 33; 33' that generates magnetic fields and comprises magnets 44, preferably in such a way that the magnets 44 of the alignment device 33; 33' which serve image-producing orientation purposes and the printing substrate 02 printed with the printing ink 06 containing the particles P move synchronously with respect to one another, at least on a section of the transport path. The alignment device 33; 33' is preferably designed as a magnetically active cylinder 33; 33', magnetic cylinder 33; 33' for short, which around the circumference comprises the arrangement of magnets 44 and over which the printing substrate 02 is guided or conveyed in the direction of an exit area of the alignment device 07. Preferably, the printing substrate 02 is guided, with the previously printed image elements 03 pointing to the outside, over the magnetic cylinder 33; 33'.

In addition to a one-piece or individual, possibly engraved permanent magnet or individual solenoid, the term “magnet” 44 here shall also be understood to mean a plurality of individual permanent magnets and/or solenoids, which are combined to form a magnetically acting unit 44, for example so as to induce, for example by overlap, a certain external magnetic field deviating in particular from the field of an individual magnetic dipole. The first side comprising the optically variable coating agent 06 shall, in particular, be understood to mean the side onto which the optically variable coating agent 06 can be applied or is being or has been applied, for example upstream in the transport path, by the application device 04.

For a simpler distinction of the term compared to further alignment devices 42; 43 described in more detail below, the aforementioned first alignment device 33; 33' introducing the image information here is also referred to, for short, as "image-producing" alignment device 33; 33' within the meaning of an introduction of image information caused by the magnetic action of the alignment device 33; 33'. A production of an image shall be understood to mean any, in particular inhomogeneous, image information caused by an, in particular inhomogeneous, alignment of the magnetic particles, which can generally be a pattern, alphanumeric symbols, a graphical representation, or a combination thereof.

Figure 5:
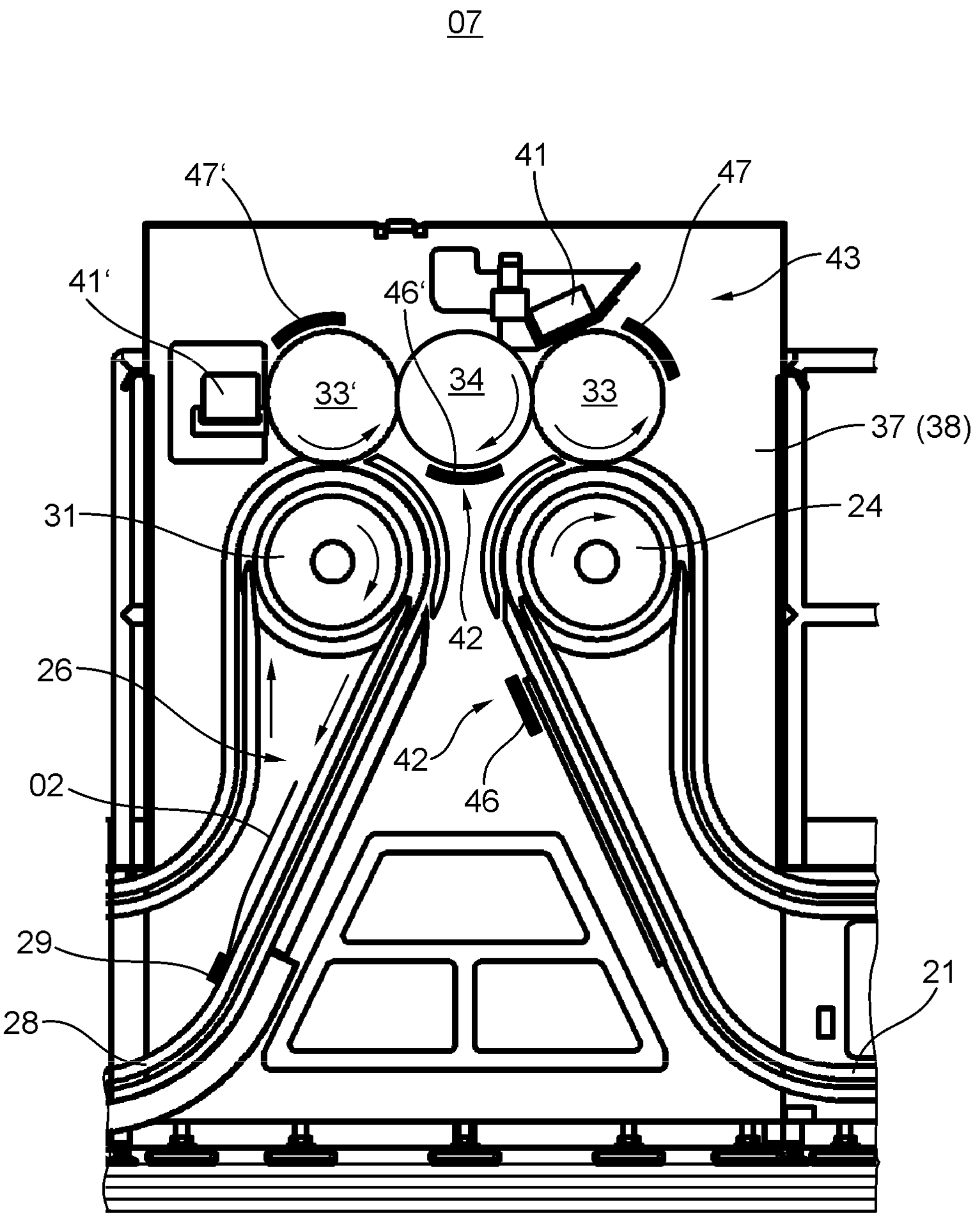
FIG. 5 an enlarged illustration of the device for aligning magnetic or magnetizable particles in a second embodiment comprising two magnetic cylinders.

Generally, it is also possible for two such first or image-producing or image information-introducing alignment devices 33; 33', in particular cylinders 33; 33', to be provided in the transport path, which are arranged on the same side, or else on different sides, of a substrate 02 to be conveyed along the transport path (see, for example, FIG. 5). In the example of FIG. 5, these are arranged on the same side of the transport path, wherein a cylinder 34 designed as a transport or transfer cylinder 34 is provided therebetween.

In the embodiment comprising a first or image-producing or image information-introducing alignment devices, at least one further alignment device 42; 43 can be assigned to this first alignment device 33; upstream and/or simultaneously.

In the embodiment comprising two first or image-producing alignment devices, however, at least one further alignment device 42; 43 can be assigned to each alignment device 33; 33' upstream and/or simultaneously.

In addition to the image-producing first alignment device 33; 33' within the above meaning or the magnetic cylinder 33; 33', in a first particularly advantageous embodiment at least one further alignment device 42, which serves pre-orientation purposes and comprises a plurality of magnets 46, arranged in a stationary manner in the machine or device during operation, is arranged upstream from the first alignment device 33 in the transport path of the substrate 02 to be conveyed in such a way that this alignment device can induce a pre-orientation of the particles P, in surface areas that are at least adjacent to the image-producing partial regions. In particular, the magnets 46 in this second alignment device 42 are configured and oriented in such a way that the particles P of the surface area passing through their active region are at least aligned with respect to the progression of their longitudinal axis in the substrate plane, for example parallel to one another or homogeneously in another manner. The magnets 46 of this second alignment device 42, however, are preferably configured and oriented in such a way that the particles P of the surface area passing through their active region are biaxially aligned, for example parallel to one another or homogeneously in another manner, so that a homogeneous optical impression is created across this surface area. This means, for example, that the particles P are aligned, for example parallel to one another or homogeneously in another manner, both with respect to their longitudinal direction and with respect to the progression in the direction of the width. Even though, ideally, a homogeneous, substantially parallel alignment is to be preferred over a background for a subsequent application of image information, in a broader sense a homogeneous optical impression or a homogeneous alignment can also be interpreted as a color or intensity profile that changes steadily in one direction, that is, without step-like perceptible changes. Such a profile arises, for example, from an inclination of the relevant axis profile changing only slowly and steadily, that is, without step-like changes, in one direction.

In an embodiment to be preferred, the magnets 46 are configured and arranged in such a way that their resulting magnetic fields align the particles P, which, for example, are planar and have a length that is larger compared to the width, in the relevant surface area of the image element 03 with their flat side parallel to the substrate surface and/or with their longitudinal extension all pointing in the same direction. In addition to a one-piece or individual, possibly engraved permanent magnet or solenoid, the term "magnet" 46 here shall in particular also be understood to mean a plurality of individual permanent magnets and/or solenoids, which are combined to form a magnetically acting unit 46, for example so as to induce, for example by overlap, a certain external magnetic field deviating in particular from the field of an individual magnetic dipole. These are preferably present in the form of a magnetically acting unit 46 as a result of a complex structure made of a plurality of permanent magnets.

In an embodiment that is not shown, in which a further alignment device for the pre-orientation of particles P is arranged upstream from a first alignment device 33; 33' designed as a magnetic cylinder 33; 33', and a transport cylinder (for example comparable to the transport cylinder 34) is arranged upstream for the conveyor device 19 arranged upstream from the magnetic cylinder 33; 33' instead of a revolving gripper conveyor 19, the further alignment device 42 provided for pre-orientation purposes is preferably designed, as shown in FIG. 5, around the circumference of the transport cylinder 34, and preferably with curved magnets 46'.

Instead, or preferably in addition to this first further alignment device 42, in a particularly advantageous embodiment or refinement, a further alignment device 43, which serves simultaneous orientation purposes and comprises one or more magnets 47, is provided, which is arranged at the transport path, on the side of the transport path located opposite the first alignment device 33, in such a way that identical and/or mutually adjacent surface areas of an identical image element 03, which is to be produced by applying the coating agent onto the substrate 02, at the same time cooperate, at at least one point in the transport path, with the first and with the further alignment devices 33; 43 serving a simultaneous orientation of particles P. In other words, particles P of an image element 03 are or have been acted upon by an aligning force at at least one point of the transport path by the magnetic field of a magnet 44 of the first alignment device 33 and, at the same time, the same and/or other particles P of the same image element 03 are or have been acted upon by an aligning force by the magnetic field of a magnet 47 of the further alignment device 33 serving simultaneous orientation purposes. In addition to a one-piece or individual, possibly engraved permanent magnet or solenoid, the term "magnet" 47 here shall also be understood to mean a plurality of individual permanent magnets and/or solenoids which are combined to form a magnetically acting unit 47, for example so as to induce, for example by overlap, a certain external magnetic field deviating in particular from the field of an individual magnetic dipole. These are preferably present in the form of a magnetically acting unit 44 as a result of a complex structure made of a plurality of permanent magnets.

Figure 2:
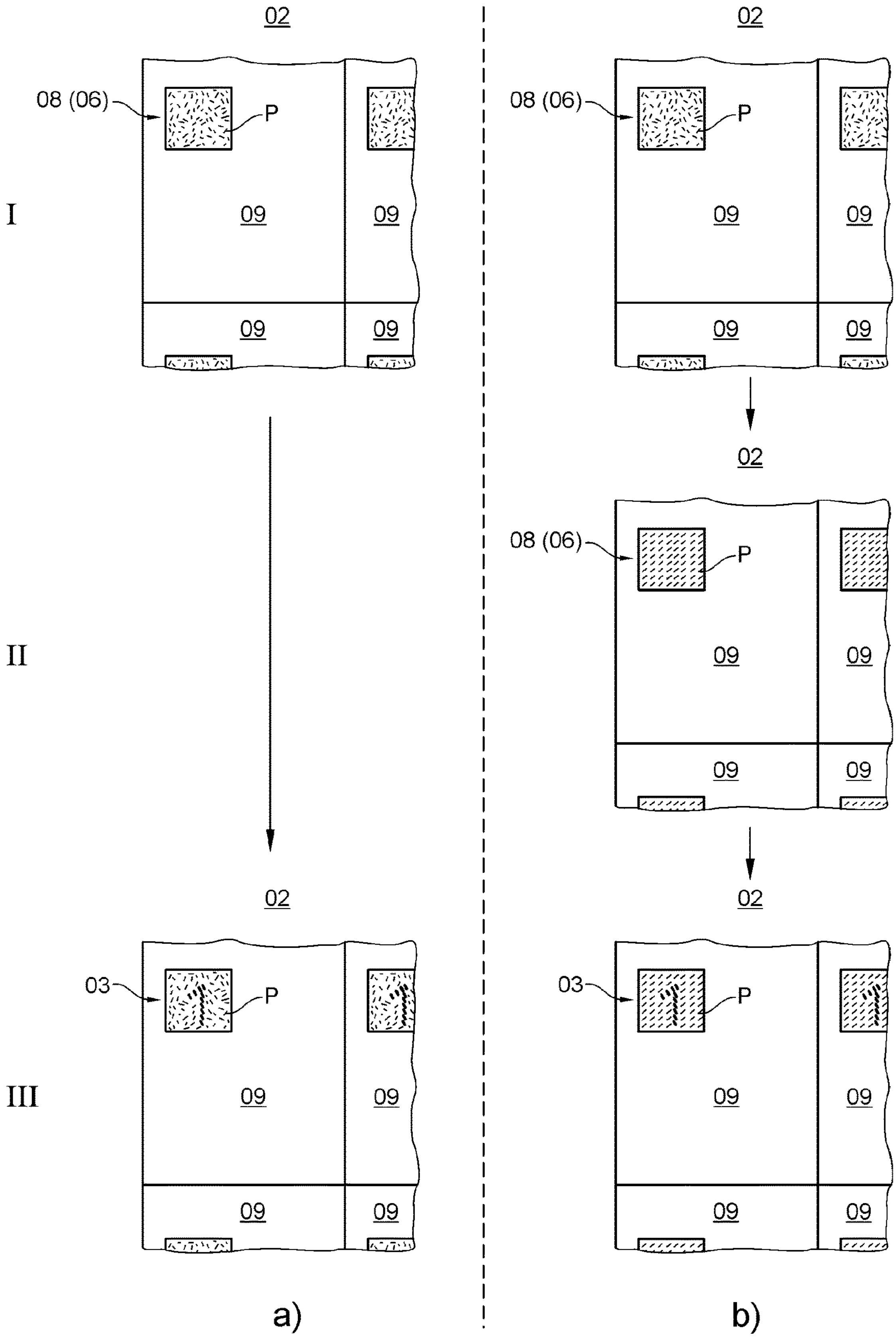
FIG. 2 a schematic illustration of a substrate printed in print elements with an optically variable coating agent, showing on the left side, FIG. 2 *a*), an alignment using only the image-producing alignment device, that is, the alignment device introducing the image information, and on the right side, FIG. 2 *b*), an alignment using at least one further alignment that induces a pre-orientation and/or simultaneous orientation.
Figure 3:
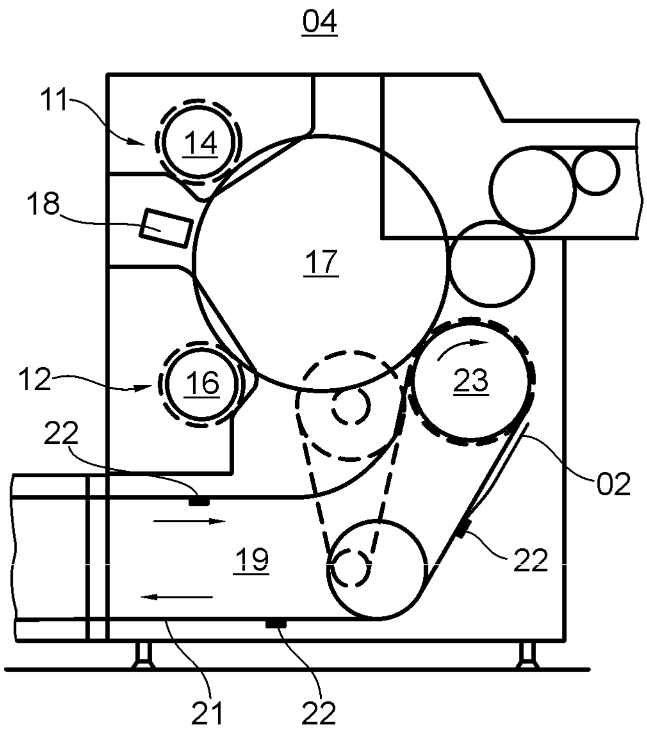
FIG. 3 an enlarged illustration of the printing unit from FIG. 1.

FIG. 2 on the right side (FIG. 2 *b*)) schematically shows the action of a pre-orientation and/or simultaneous orientation, wherein the Roman numeral II represents a state II in which the coating agent 06 was, for example, pre-oriented or simultaneously oriented, an image-producing alignment within the above meaning, however, has not yet taken place or was disregarded in the illustration.

Details and preferred embodiment details regarding a further alignment device 42 serving pre-orientation purposes and regarding a further alignment device 43 serving simultaneous orientation purposes are described in greater detail below.

The first or only magnetic cylinder 33 is arranged in the transport path of the substrate 02 to be conveyed, preferably on its second side, so as to point outwardly with its first side, which is coated in particular upstream in-line with optically variable coating agent 06, while being transported over the first or only magnetic cylinder 33.

In the region of its outer circumference, the magnetic cylinder 33 comprises a plurality of magnets 44, which are used to orient at least some of the magnetic or magnetizable particles P of the coating agent 06 applied onto the passing printing substrate 02. Here, in general, magnets shall be understood to mean magnetically active devices that, permanently or switchably, at least toward the side of the transport path, induce a magnetic field (that is sufficiently strong, in particular for aligning particles P contained in the coating agent 06 on the substrate 02 being guided over the same, as described here). The magnets 44 can be formed by one or more permanent magnets with or without engraving, by solenoids, or by combinations of one or more permanent magnets and/or one or more solenoids. Regardless of whether a single magnet or a combination of multiple magnetic elements, for example permanent magnets and/or solenoids is involved, associated magnetic elements that, collectively, form an acting unit are referred to hereafter as magnets 44 for short. Such a magnet may, for example, be joined from several differently oriented permanent magnets, which in sum supply an outwardly active magnetic field.

For the case of the aforementioned plurality of multiple-up copies 09 per substrate 02, for example per substrate section or printing substrate or substrate sheet 02, several rows of magnets 44 that are spaced apart from one another transversely to the transport direction T are provided, or can be provided, around the circumference, which, when rolled out on the substrate 02, correspond to the pattern of the image elements 03 to which magnetic fields are to be applied on the substrate 02. The aforementioned guidance of the substrate 02 over the magnetic cylinder 33, wherein, for example, its first side points outwardly when transported over the first cylinder 33, results in the particles P being aligned or oriented by means of the magnets 44, here, for example, through the substrate 02. The non-fitted cylinder is also referred to as cylinder body here, which can be fitted with magnets 44 and is active as a magnetic cylinder 33.

Preferably, the magnets 44 are arranged or can be arranged detachably, possibly together with a corresponding mount, at the cylinder 33 in such a way that they, in the mounted state, can be arranged at a defined location around the circumference of the cylinder 33 and can preferably be completely removed from the cylinder 33 and/or can be positioned around the circumference of the cylinder 33 in the axial and/or circumferential directions.

Figure 6:
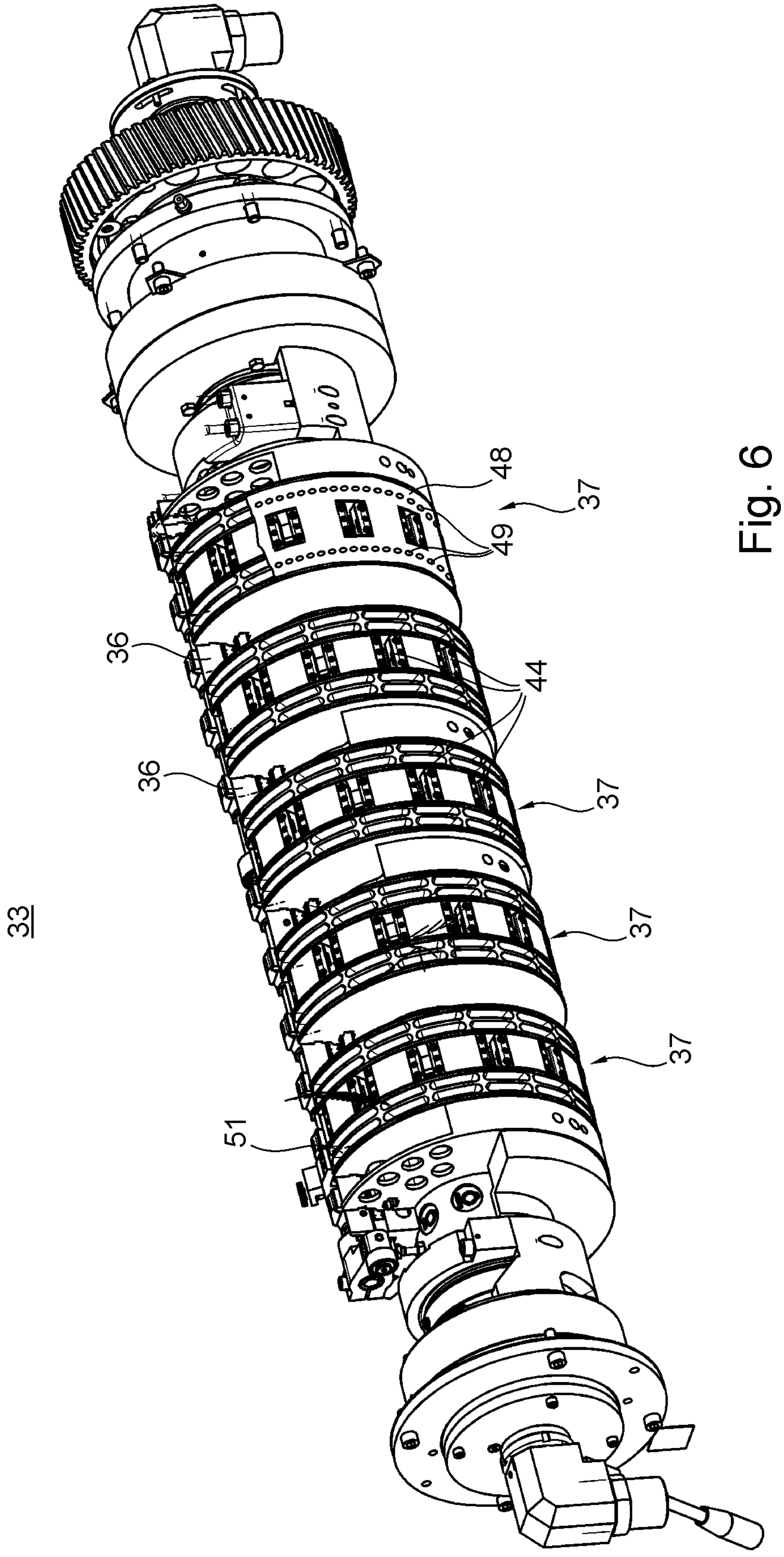
FIG. 6 an oblique view of an embodiment for a magnetic cylinder.
Figure 7:
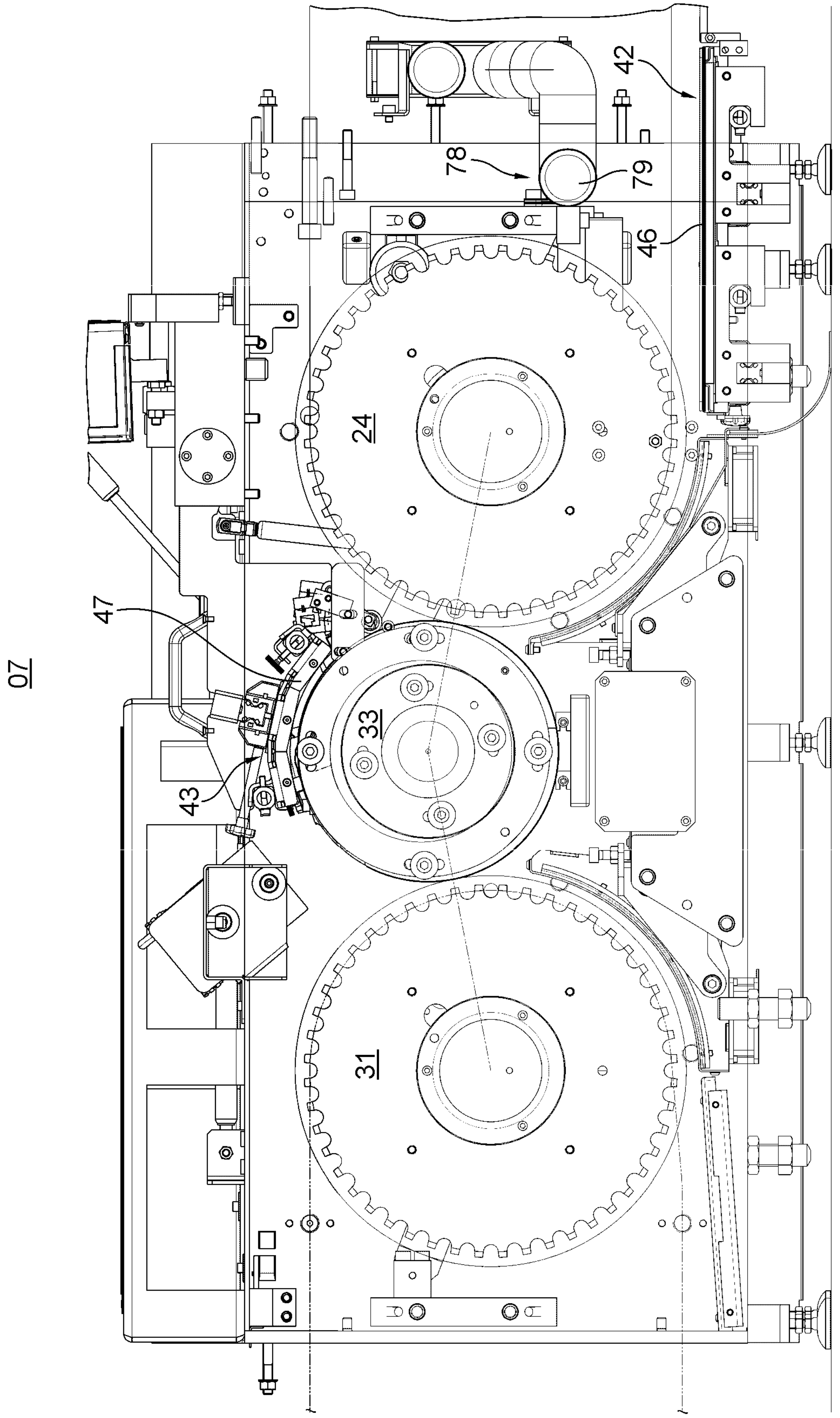
FIG. 7 a detail view of an alignment of magnetic or magnetizable particles, by way of example in an embodiment according to FIG. 4.
Figure 8:
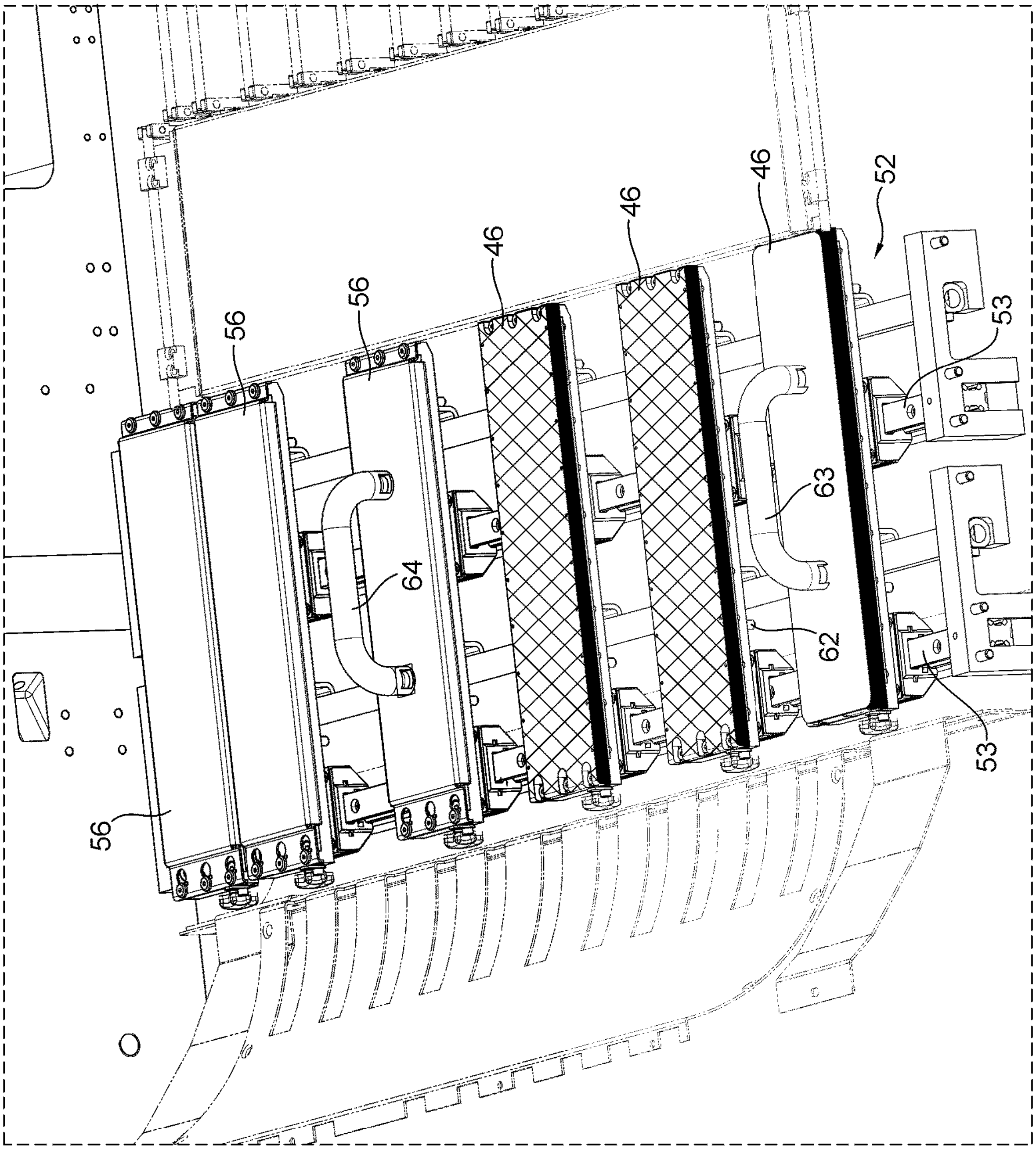
FIG. 8 an oblique view of an alignment device, provided in the machine, for pre-orienting magnetic particles, by way of example fitted with magnets and with filler pieces as well as handles for removing such magnets or filler pieces.
Figure 9:
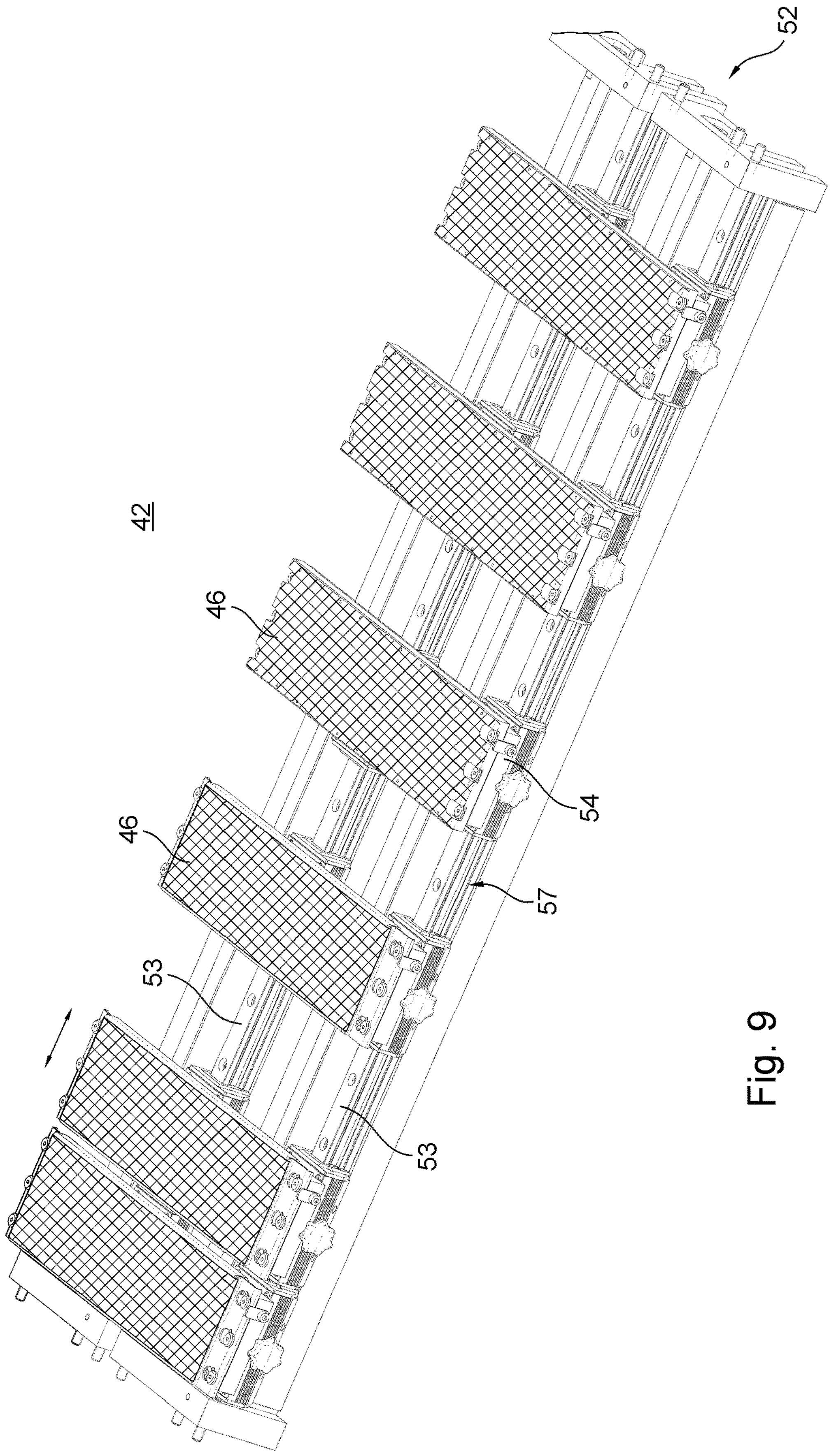
FIG. 9 an isolated illustration of the alignment device from FIG. 8 completely fitted with magnets.
Figure 10:
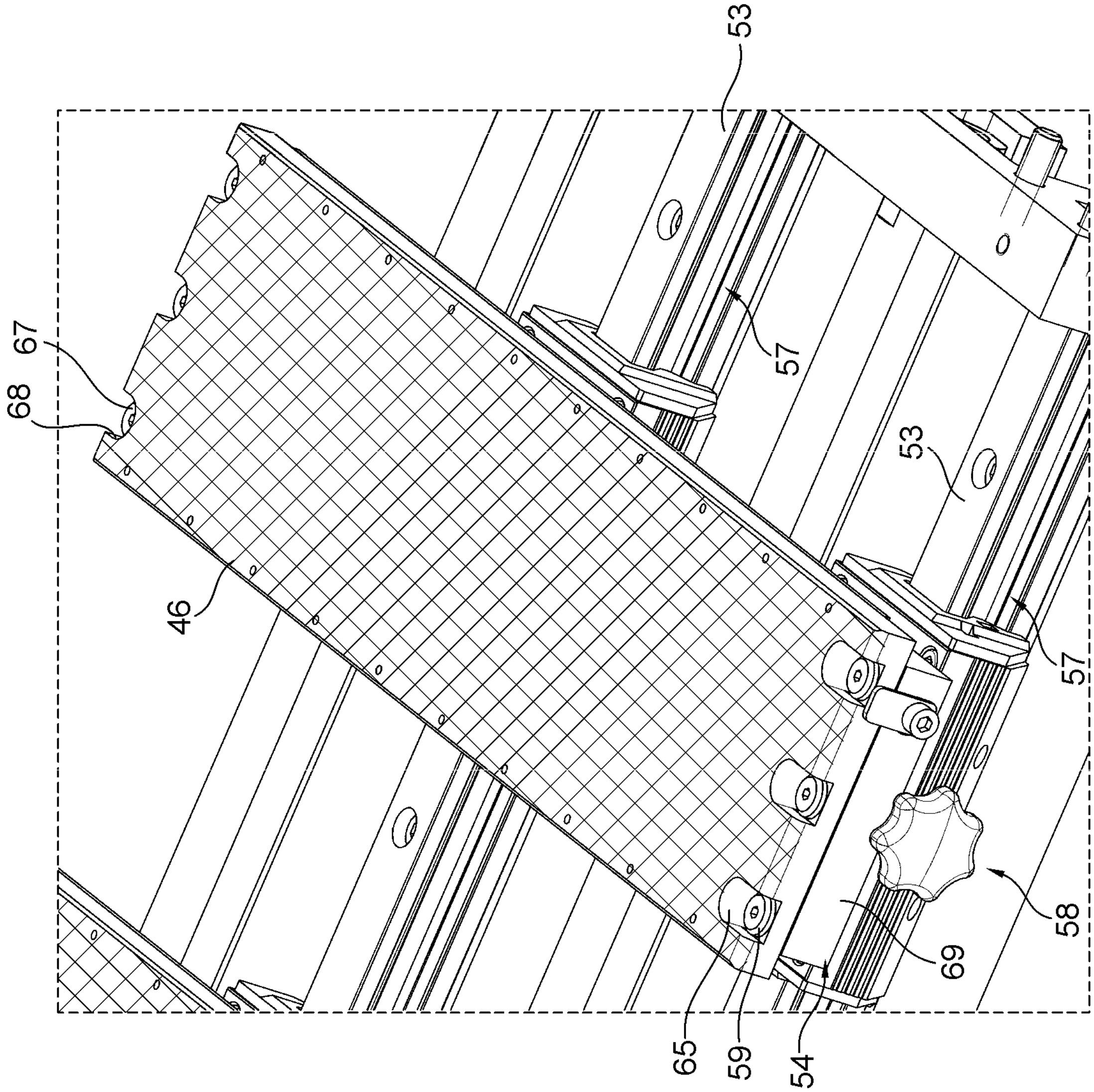
FIG. 10 a perspective enlarged view from FIG. 9.

For this purpose, the magnets 44 can be arranged or are arrangeable in or at multiple, for example between four and eight, in particular between five and seven, for example six, ring elements 37 that can be axially spaced apart from one another and preferably be positioned in the axial direction, wherein in or at these ring elements 37, in turn, in each case at least one, preferably multiple, for example between two and twelve, advantageously between five and ten, magnets 44 are arranged or can be arranged one behind the other in the circumferential direction and preferably are positioned or can be positioned in the circumferential direction (see, for example, FIG. 6). In the region of their outer circumference, the ring elements 37 are closed, for example, by peripheral coverings 48, for example covers 48 connected in one piece to the ring ribs or cover plates 48 placed thereon, in which, for example, aforementioned suction openings 49 as well as cut-outs, which are not denoted in detail, are provided at the respective location of the magnetic elements 44 (indicated, by way of example, for a portion of the right ring element 37 in FIG. 6). As an alternative, a cover plate 48 that extends axially across all ring elements 37 can be provided, which has cut-outs and/or suction openings 49 at the relevant points. The suction openings 49, in particular suction channels 51 therebeneath, have a line connection to a vacuum pump, for example via an end-face rotary feedthrough.

For the case of web-format substrates 02, the magnetic cylinders 33 can be designed without any holding means acting on the substrate 02. If necessary, the aforementioned suction air openings can be provided around the circumference, which are connected to a vacuum pump and ensure that the substrate 02 rests securely on the outer cylindrical surface. For the case of sheet-format substrate 02 preferred here, holding means 36, for example grippers 36 of a so-called gripper bar, are provided around the circumference of the cylinder 33, by which a substrate sheet 02 to be conveyed via the cylinder 33 can be received at its leading end, and can be held or is held during a rotation of the cylinder 33 over an angular region. A magnetic cylinder 33 configured in this way at the same time serves to transport the substrate 02. The magnetic cylinder 33 is rotatably mounted on both sides in frame walls 38; 39, for example side parts 38; 39 of a frame carrying the components of the alignment device 07.

As was already mentioned above, applied particles P, for example at least in a surface area that is relevant for the image or motif to be represented, prior to cooperating with the alignment device 33; 33' provided for the image-producing alignment and/or upstream thereof and/or at at least a point in time or during a time period during the cooperation with the alignment device 07 provided for the image-producing alignment, can be oriented with the aid of at least one further alignment device 42; 43 serving pre-orientation and/or simultaneous orientation purposes (see, for example, FIG. 8 to FIG. 12).

The effect of such a pre-alignment is illustrated based on the schematic representations in FIG. 2, where on the left side, FIG. 2 *a*), an alignment using only the image-producing alignment device 33; 33' is outlined, and on the right side, FIG. 2 *b*), an alignment using at least one of the further alignment device 42; 43 inducing a pre-orientation and/or simultaneous orientation is outlined for comparison. In the case of the latter, for example, particles P, instead of being present with random orientation outside of an image motif or pattern, are organized, for example, parallel or homogeneously in another manner, and thus form a background that provides improved contrast for a pattern or image motif having differently oriented particles P. The further alignment device 42 serving pre-orientation purposes is preferably fixed to the frame at the transport path during normal operation.

Preferably, the magnets 46 of the further alignment device inducing a pre-orientation are provided on the side of the transport path, which is located opposite the side on which, in the upstream transport path, most recently a printing operation was carried out or onto which the coating agent 06 was applied. This means, the magnets 46 are preferably provided on the side of the conveyed substrate 02 that was not most recently or freshly printed.

Even though, generally, a one-piece or multi-piece magnet 46 that continues across the entire active width of the alignment device 42 can be provided, the further alignment device 42 provided for pre-orientation purposes preferably comprises, transversely to the transport direction T, a plurality, for example between four and eight, in particular between five and seven, for example six, magnets 46, which are spaced apart from one another transversely to the transport direction T. In this way, disruption due to undesirable field overlaps is minimized.

So as to be able to carry out adaptations by replacement and/or so as to be able to achieve operation without pre-orientation in a simple manner, the magnets 46 of the further alignment device 42 are detachably arranged at a supporting frame 52. In addition, or as an alternative, the supporting frame 52, including the magnets 46, can be removably arranged in the frame of the alignment device 07.

In a particularly advantageous refinement of the magnets 46 that can be detached and removed from the supporting frame 52, these can be exchanged for filler pieces 56, for example, guide plates 56. This enables an operation without this additional alignment and without the positions of the particles P being "disturbed" by the magnets 46. At the same time, the substrate 02 is protected by the filler pieces 56 against damage.

For removing or inserting magnets 46, for example, a gripper tool 63, for example a handle 63, is provided, which comprises magnetic or magnetizable elements in the region cooperating with the magnet 46. So as to avoid localized contact of the handle 63 with the magnet surface, the handle 63 can comprise a plate that can be placed in a planar manner on the magnet surface.

In an advantageous embodiment, the filler piece 56 can be made of a magnetizable material, for example a magnetizable stainless steel. In this embodiment, the filler piece, for removal or for insertion, can likewise be held by a releasable gripper tool 64, for example a releasable handle 64, which comprises, for example, magnetically active elements, for example one or more permanent magnets, in the region cooperating with the filler piece 56.

In an advantageous embodiment, the magnets 46 of the further alignment device 42 serving pre-orientation purposes are arranged at the supporting frame 52 so as to be adjustable in a horizontal direction transversely to the transport direction T, for example in order to allow multiple-up copies 09 of differing formats and/or multiple-up copies 09 including image elements 03 that are differently positioned on the multiple-up copy 09 to be produced.

For this purpose, the magnets 46 of this further alignment device 42 are mounted so as to be transversely movable at one or more cross members 53, for example in one or more guides 57, for example linear guides 57.

For fixation in the desired position, a holding device 58, for example a clamping mechanism 58, is provided, which can preferably be operated manually and without tools. This may be a hand wheel, for example, by which a screw bolt can be set against and removed from the cross member 53 carrying the magnet 46.

For example, so as to be able to establish and/or ensure a defined distance between the magnet 46, the substrate 02 or the transport path thereof, the magnets 46 rest against stop means 59, as viewed in the direction perpendicular to the transport path. Preferably, the magnets 44 are acted upon or can be acted upon by a spring force, for example by one or more spring elements 62, with a force pointing in the direction of the transport path, and in particular against the stop means 59.

The stop means 59 can be designed adjustably as a fitted element 59 and, for example, be effectuated by a fitted bolt 59. Depending on the arrangement, the head of the fitted bolt can form the stop or, as is shown here, the lower head ring or a washer held by the same.

Preferably, the magnet 46 of the further alignment device 42 is fixed or can be fixed by the fitted bolt 59 to a mount 54, wherein, for example, the distance with respect to the transport plane of the substrate 02 can be adjusted by the screw-in depth.

In an advantageous embodiment, the magnet 46 can be easily detached from the supporting frame 52, for example from a mount 54, for example a rider 54, that carries the magnet 46 and is arranged in particular so as to be transversely movable on the cross member 53. In the process, on its upper side the rider 54 can comprise a carrier plate 69 on which the magnet 46 is attached. The magnet 46 of the further alignment device 42 is held, for example, by way of a connection 59, 61; 67; 68 that is positively active in the direction of the transport path, which can be released by a movement of the magnet 46 having at least one movement component that is located in a plane extending parallel to the transport plane.

Figure 11:
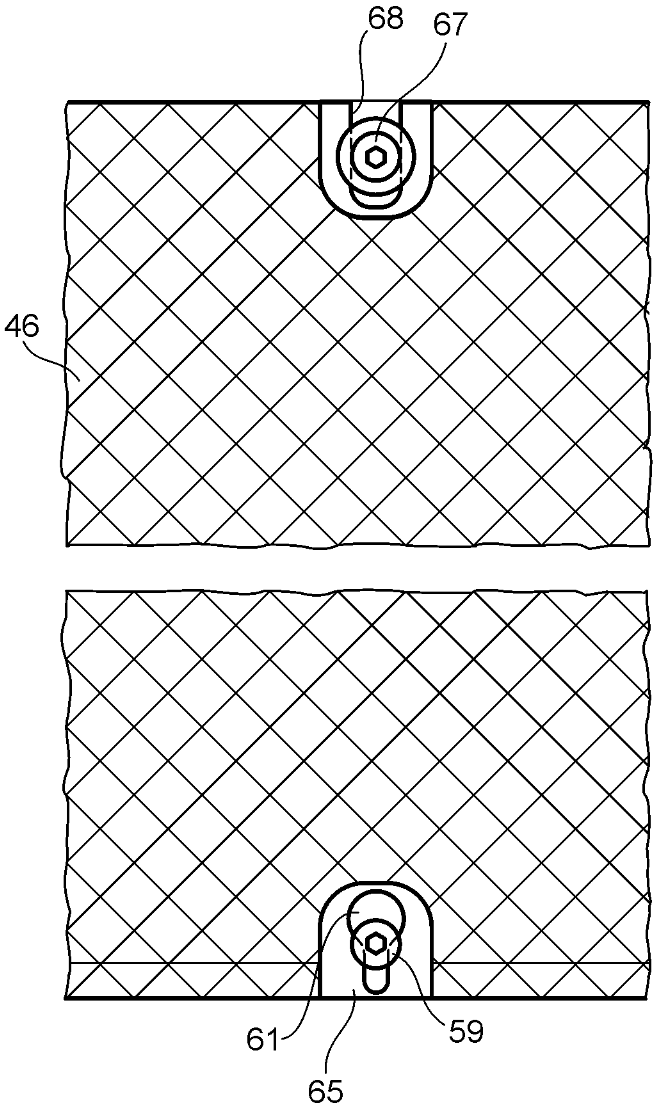
FIG. 11 a detail illustration of an embodiment for detachably attaching a magnet to a supporting frame of the alignment device.
Figure 12:
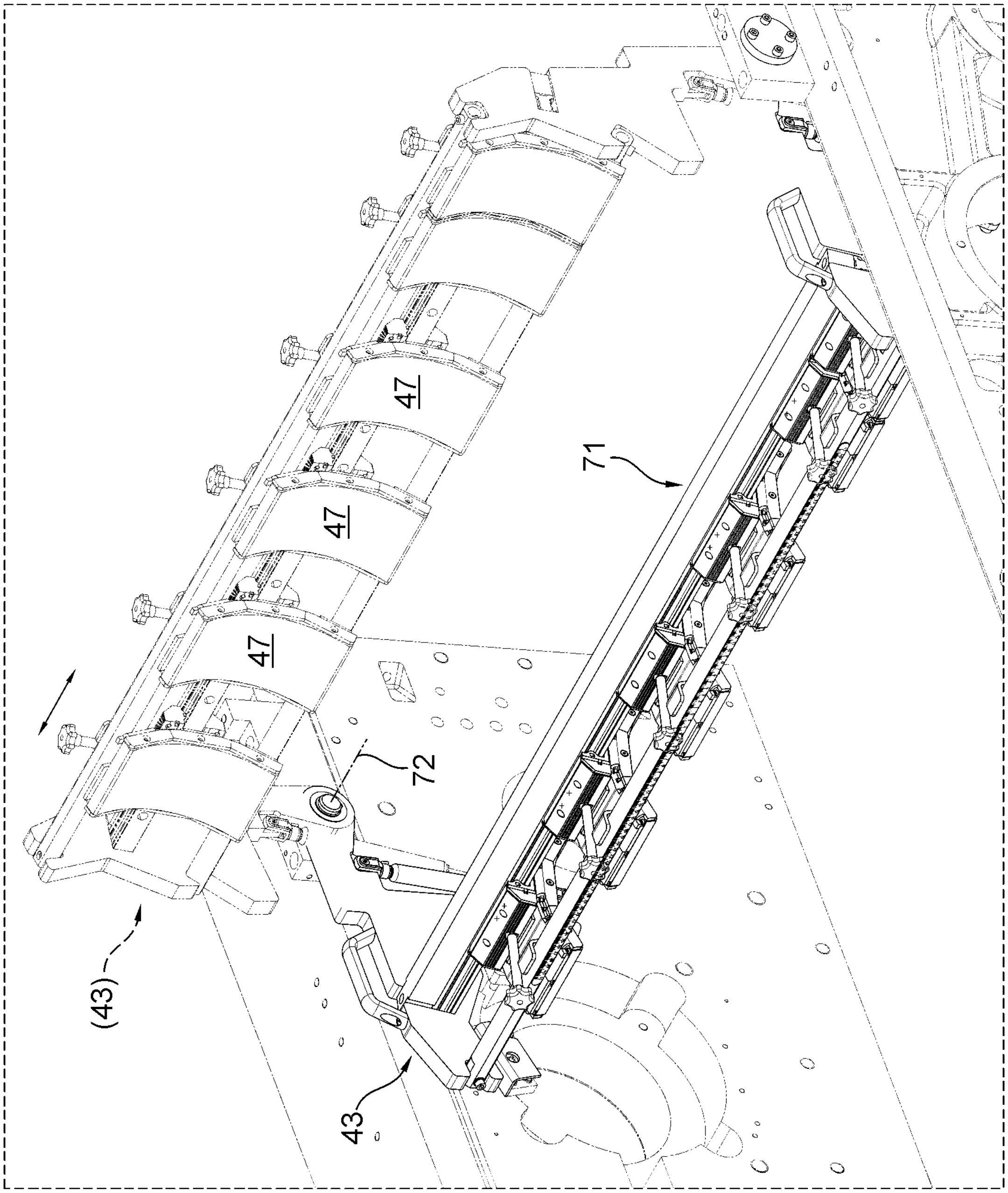
FIG. 12 an oblique view of an alignment device, provided in the machine, for simultaneously orienting particles in the operating position (solid lines) and in the makeready or inactive position (dash-dotted illustration)
Figure 13:
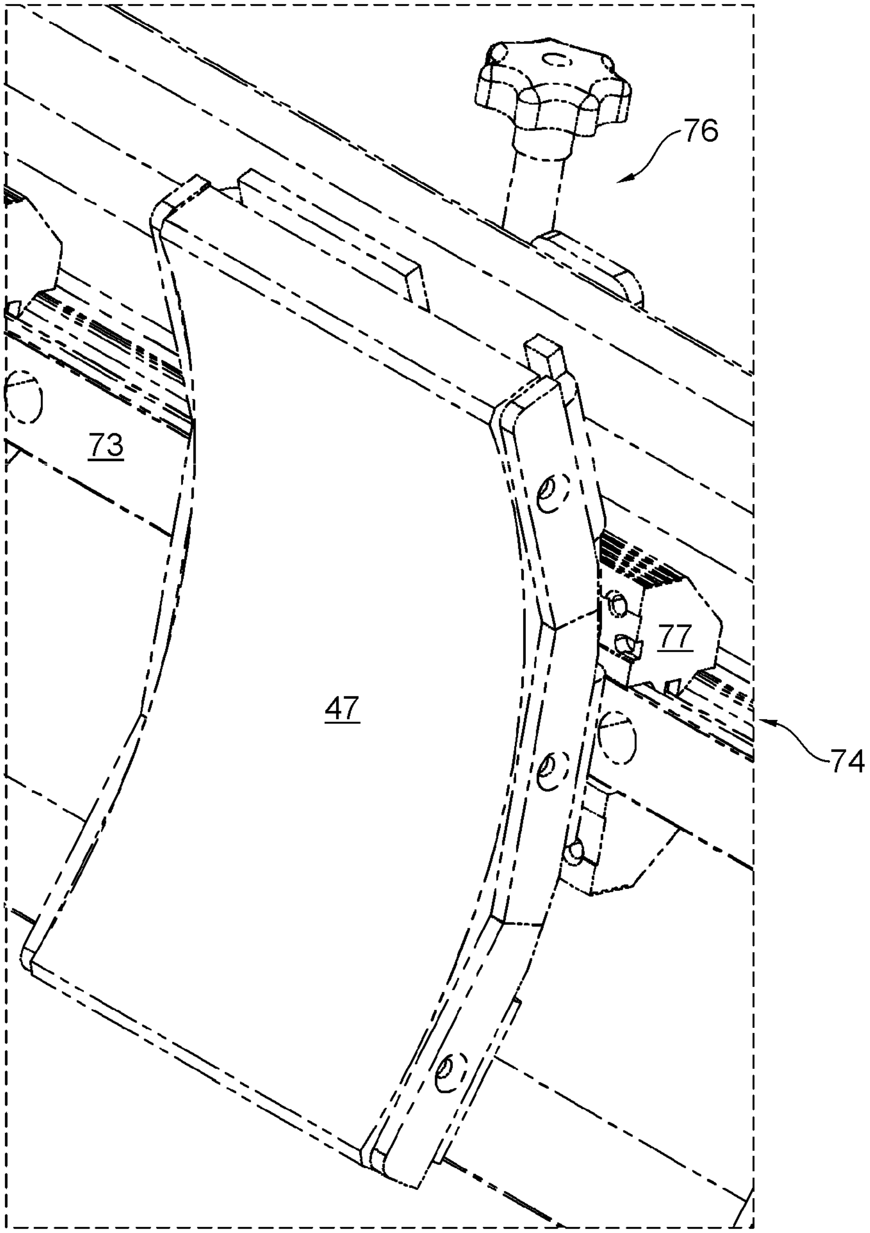
FIG. 13 a detail view of a magnet from the representation of a magnet in a pivoted-away position.

Such a positive connection can, for example, be formed on a side, for example at an end, by the aforementioned fitted bolt 59 and an in particular keyhole-shaped cut-out 61 in the manner of an accordingly shaped elongated hole or slot 61, and, for example, corresponding thereto, on another side, for example the other end, likewise by a stop means 67 that, for example, is active in the direction of the transport path, for example in the above-described manner a fitted bolt 67 that is active as a fitted element 67, which likewise engages in a cut-out 68, for example a likewise keyhole-shaped elongated hole 68 or preferably a slot 68 that is open at the edge (see, for example, FIG. 11). The fitted bolts 59; 67 and cut-outs 61; 68 can be recessed in troughs 65, for example so-called pockets 65, comprised by the magnet 46, striking with the stop surface thereof against the bottom of the trough 65 or, in the case of a bottom receiving the magnet 46, against the same.

In an advantageous refinement, a blower device 78 can be provided, by which the substrate 02 is pressed against the magnets 46. The blower device 78 can comprise a blower tube 79, which extends transversely to the transport direction T and has blower air openings pointing in the direction of the transport path, which is supplied via a supply line from a blower air source. In this way, a defined position is achieved and/or, due to the close contact, a substantially homogeneous magnetic field is induced in the coating.

If the transport occurs via a revolving gripper conveyor 19, all or at least one or more of the grippers of the gripper bar 22 can be made of a non-magnetic or non-magnetizable material.

As was already mentioned above and is illustrated in FIG. 1, FIG. 4 and FIG. 8 to FIG. 10, the magnets 46 of the further alignment device 42 inducing a pre-orientation can be arranged at a linear transport path section and, at least on the side facing the transport path, can have a planar shape that is elongated in the transport direction T. This is the case, for example, when the conveyor device 19 includes a linear section in the region of the alignment device 42.

In particular in the case that, however, a curved transport path section, for example a transport cylinder 34, is arranged upstream from the alignment device 07 or the image-producing alignment device 33; 33', the magnets 46 of the further alignment device 42 can be arranged at a curved transport path section, which is formed, for example, by a circumferential section of such a rotating transport means, and, at least on the side facing the transport path, can have a curved, in particular circular segment-like, shape that is elongated along the transport path.

Instead of the aforementioned first further alignment device 42, or preferably in addition thereto, the aforementioned second further alignment device 43 comprising one or a plurality of magnets 47 is advantageously provided, which is arranged at the transport path on the side of the transport path which is located opposite the first alignment device 33.

This alignment device 43 serving orientation purposes is also preferably fixed to the frame at the transport path during normal operation.

The magnets 47 of this alignment device 43 are preferably provided around the circumference of the image-producing alignment device 33, designed as a magnetic cylinder 33, on the opposite side of the transport path.

Preferably, the further alignment device 43 provided for simultaneous orientation comprises, transversely to the transport direction T, a plurality, for example between four and eight, in particular between five and seven, for example six, magnets 47 that are spaced apart from one another transversely to the transport direction T.

Preferably, the magnet or magnets 47 of this further alignment device 43 is or are arranged at a supporting frame 71, which is mounted so as to be able to vary the position thereof in a frame of the device in such a way that the magnets 47 can be moved from a working position into a makeready or inactive position at a distance with respect to the transport path which is greater compared to the working position, and vice versa.

Preferably, the supporting frame 71 carrying the magnets 47 of the further alignment device, for this purpose, is pivotably mounted about an axis 72 extending transversely to the transport direction T, for example a pivot axis 72, in a frame of the alignment device 07.

In a particularly advantageous embodiment, for example with respect to high product variability, the magnets 47 of the further alignment device 43 are arranged at the supporting frame 71 so as to be movable or adjustable in a horizontal direction transversely to the transport direction T.

For this purpose, the magnets 47 of the further alignment device 43 are, for example, transversely movably mounted at one or more cross members 73. They can be fixable in a desired position by a holding device 76 designed as a clamping mechanism 76, which is comparable, for example, to the above clamping mechanism 58.

For this purpose, the magnets 47 of this further alignment device 43 are mounted so as to be transversely movable at one or more cross members 77, for example by way of an appropriate mount 77, for example one or more riders 77, guided in one or more guides 74, for example linear guides 74.

In particular in the case of the preferred embodiment of the image-producing alignment device 33, 33' serving as magnetic cylinders 33; 33', the magnets 47 of the further alignment device 43 serving simultaneous orientation purposes are arranged at a curved transport path section, in particular at the circumference of the magnetic cylinder 33, 33', and, at least on the side facing the transport path, have a curved, in particular circular segment-like, shape that is elongated along the transport path.

Regardless of the arrangement of only one or both of the further alignment devices 42; 43 at the transport path, in an embodiment that is to be preferred, a drying and/or curing device 41; 41' is arranged so as to act on a point of the transport path still located in the active region of the image-producing alignment device 33; 33'.

In a particularly advantageous embodiment of the drying and/or curing device 41; 41', this device is directed at a circumferential section, located in the transport path, of the first alignment device 33 designed as a magnetic cylinder 33; 33'.

Such a drying and/or curing device 41; 41' is preferably implemented as a radiation dryer 41; 41', in particular as a UV radiation dryer 41; 41' and/or as an LED dryer 41; 41', in particular as a UV LED dryer 41; 41'.

In an advantageous embodiment of the machine 01, the respective further alignment device 42; 43 preferably comprises a number of magnets 46; 47 corresponding to the number of the aforementioned columns, for example between four and eight, in particular between five and seven, for example six, which are arranged in the transport path in such a way that the print motifs or groups of image-producing print motifs along the transport path in each case are at least partially aligned with the lateral position of the magnets 46; 47 of the relevant further alignment device 42; 43.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A machine (01) for generating optically variable image elements (03) on a substrate (02) having a web-format or sheet-format, the machine (01) comprising:

a printing substrate infeed (13), at least one printing unit (04) comprising at least one printing mechanism (11; 12), by which the substrate (02) guided on a transport path of the substrate (02) through the machine (01) is printed and/or can be printed at least on a first side with a coating agent (06) containing particles (P) that are magnetic or magnetizable, a product receiving system (27) used to receive the substrate (02) treated in the machine (01), and a device (07) for aligning the particles (P) contained in the coating agent (06) which is printed at least on the first side of the substrate (02), wherein the device (07) is provided in the transport path of the substrate (02) between the at least one printing unit (04) and the product receiving system (27);

the at least one printing mechanism (11; 12) comprising, as an image-producing cylinder, a forme cylinder (14; 16) including a plurality of image-producing print motifs or groups of image-producing print motifs around a circumference of the forme cylinder (14; 16), which on a circumferential length corresponding to a print image length are arranged in multiple columns, which are equidistantly spaced apart from one another transversely to a transport direction (T), and on a cylinder width corresponding to a print image width are arranged in multiple rows, which are equidistantly spaced apart from one another in the transport direction (T);

the device (07) for aligning the particles (P) comprising a first alignment device (33; 33'), which is arranged in the transport path of the substrate (02) and, in a region of a side of the first alignment device (33; 33') facing the transport path, comprises a first plurality of magnets (44) to align, in a surface area comprising the coating agent (06), at least some of the particles (P) contained in the coating agent (06) in order to generate image information; wherein:

the first plurality of magnets (44) of the first alignment device (33; 33') serving alignment purposes and the substrate (02) to which the coating agent (06) containing the particles (P) is applied are movable synchronously with respect to one another, at least on a section of the transport path of the substrate (02), the device (07) for aligning the particles (P) comprises at least one first further alignment device (42), which is arranged upstream from the first alignment device (33; 33') in the transport path of the substrate (02) and which, during operation, is fixed to a frame at the transport path of the substrate (02) and, transversely to the transport direction (T), the at least one first further alignment device (42) comprises a second plurality of magnets (46) that are spaced apart from one another transversely to the transport direction (T) and, during operation, remain stationary in the at least one first further alignment device (42), a number of the second plurality of magnets (46) corresponds to a number of the columns of the image-producing print motifs or groups of image-producing print motifs disposed around the circumference of the forme cylinder (14; 16), and the second plurality of magnets (46) included in the at least one first further alignment device (42) are arranged in the transport path of the substrate (02) so that the image-producing print motifs or groups of image-producing print motifs are each at least partially aligned with a lateral position of at least one of the magnets (46) of the second plurality of magnets (46) of the first further alignment device (42) along the transport path of the substrate (02), wherein the second plurality of magnets (46) are positioned to perform a pre-orientation of a plurality of the particles (P) included in the coating agent (06) as the substrate (02) printed with the coating agent (06) traverses the at least one first further alignment device (42), and wherein the first plurality of magnets (44) of the first alignment device (33; 33') are positioned to perform additional orientation of the particles (P) in the coating agent (06) printed on the substrate (02) following the pre-orientation of the plurality of particles (P) at the at least one first further alignment device (42).

2. The machine according to claim 1, characterized in that the first alignment device (33; 33') is formed by a magnetic cylinder (33; 33'), which is arranged in the transport path of the substrate (02) and, in a region of an outer circumference of the magnetic cylinder (33; 33'), comprises the first plurality of magnets (44).

3. The machine according to claim 1, characterized in that a drying and/or curing device (41) is arranged at the transport path of the substrate (02) so as to act on a point of the transport path of the substrate (02) located in a magnetically active region of the first alignment device (33; 33').

4. The machine according to claim 3, characterized in that the first alignment device (33; 33') is formed by a magnetic cylinder (33; 33), and the drying and/or curing device (41) is directed at a circumferential section of the magnetic cylinder (33; 33') located in the transport path of the substrate (02), and/or the drying and/or curing device (41) is implemented as a UV radiation dryer and/or as an LED dryer.

5. The machine according to claim 1, characterized in that the first further alignment device (42) serving pre-orientation purposes is arranged upstream from the first alignment device (33; 33') in the transport path of the substrate (02) in such a way that arrangement and alignment of the second plurality of magnets (46) in relation to the surface area comprising the coating agent (06), and that encompasses the image information to be generated, induces or can induce a homogeneous pre-orientation of a majority of the particles (P), and the particles (P) have a non-spherical, flat shape, having a longitudinal axis extending for a length in a direction of a longest extension, an axis extending perpendicularly to the longitudinal axis in a direction of a width, and a thickness extending with respect to both axes and being smaller compared to the length and the width, at least with respect to a parallel progression of the longitudinal axis of the particles (P) and which is projected in a plane of the substrate (02).

6. The machine according to claim 5, characterized in that the second plurality of magnets (46) of the first further alignment device (42) that is arranged upstream from the first alignment device (33; 33') are configured and oriented in such a way that, in a respective surface area encompassing image information to be generated, the particles (P) are biaxially aligned parallel to one another, both with respect to the longitudinal axis and the axis extending perpendicularly thereto, so that a homogeneous optical impression arises across the surface areas that encompass the image information to be generated.

7. The machine according to claim 5, characterized in that the second plurality of magnets (46) of the first further alignment device (42) that is arranged upstream from the first alignment device (33; 33') rest against respective stop means (59), as viewed in a direction perpendicular to the transport path of the substrate (02), and/or are acted upon by one or more spring elements (62) with a force pointing in a direction of the transport path of the substrate (02), and/or that the second plurality of magnets (46) of the first further alignment device (42) arranged upstream from the first alignment device (33; 33') are held by way of respective connections (59, 61; 67; 68) that are positively active in the direction of the transport path of the substrate (02), which can be released by a movement of a respective magnet (46) of the second plurality of magnets (46) in a plane extending parallel to a transport plane.

8. The machine according to claim 5, characterized in that the second plurality of magnets (46) of the first further alignment device (42) arranged upstream from the first alignment device (33; 33') are arranged at a linear transport path section and, at least on a side of the first further alignment device (42) facing the transport path of the substrate (02), have a planar shape that is elongated in the transport direction (T), or the second plurality of magnets (46) of the first further alignment device (42) arranged upstream from the first alignment device (33; 33') are arranged at a curved transport path section, which is formed by a circumferential section of a rotating transport means, and, at least on the side of the first further alignment device (42) facing the transport path of the substrate (02), have a curved shape that is elongated along the transport path of the substrate (02).

9. The machine according to claim 1, characterized in that a filler piece (56) is provided, for which a magnet (46) of the second plurality of magnets (46) of the first further alignment device (42) can be exchanged, and/or that a handle (63) is provided, which can pick up a magnet (46) of the second plurality of magnets (46) of the first further alignment device (42) by way of magnetic forces.

10. The machine according to claim 1, further comprising a second further alignment device (43) comprising a third plurality of magnets (47), wherein the second further alignment device (43) is arranged at the transport path of the substrate (02), on a side of the transport path of the substrate (02) that is located opposite the first alignment device (33; 33'), so that identical surface areas of a surface area encompassing the image information to be generated at a same time cooperate, at at least one point in the transport path of the substrate (02), with the first alignment device (33) and the second further alignment device (43) performing concurrent orientation of the particles (P).

11. The machine according to claim 10, characterized in that the third plurality of magnets (47) of the second further alignment device (43) are provided around a circumference of the first alignment device (33; 33), which is configured as a magnetic cylinder (33; 33'), and on the side of the transport path of the substrate (02) located opposite the first alignment device (33; 33').

12. The machine according to claim 10, characterized in that the second further alignment device (43), transversely to the transport direction (T), comprises the third plurality of magnets (47) that are spaced apart from one another transversely to the transport direction (T), and/or that multiple magnets (47) of the third plurality of magnets (47) of the second further alignment device (43) are arranged at a supporting frame (71) so as to be adjustable in a horizontal direction transversely to the transport direction (T) and/or are detachable.

13. The machine according to claim 10, characterized in that a number of the third plurality of magnets (47) in the second further alignment device (43) corresponds to the number of the columns of the image-producing print motifs or groups of image-producing print motifs disposed around the circumference of the forme cylinder (14; 16), and the magnets (47) included in the second further alignment device (42) are arranged in the transport path so that the image-producing print motifs or groups of image-producing print motifs are at least in each case partially aligned with a lateral position of at least one of the magnets (47) of the second further alignment device (43).

14. The machine according to claim 1, characterized in that multiple magnets (46) of the second plurality of magnets (46) of the first further alignment device (42) are arranged at a supporting frame (52; 71) so as to be adjustable in a horizontal direction transversely to the transport direction (T) and/or detachable.

15. The machine according to claim 14, characterized in that the multiple magnets (46) of the first further alignment device (42), which are arranged at the supporting frame (52) so as to be adjustable transversely to the transport direction (T) and/or detachable, are transversely movably mounted at one or more cross members (53) and/or are fixable in a desired position by a clamping mechanism (58).

* * * * *